March 7, 1933.  A. H. ACKERMAN  1,899,927
VEHICLE SEAT
Filed March 28, 1930   2 Sheets-Sheet 1
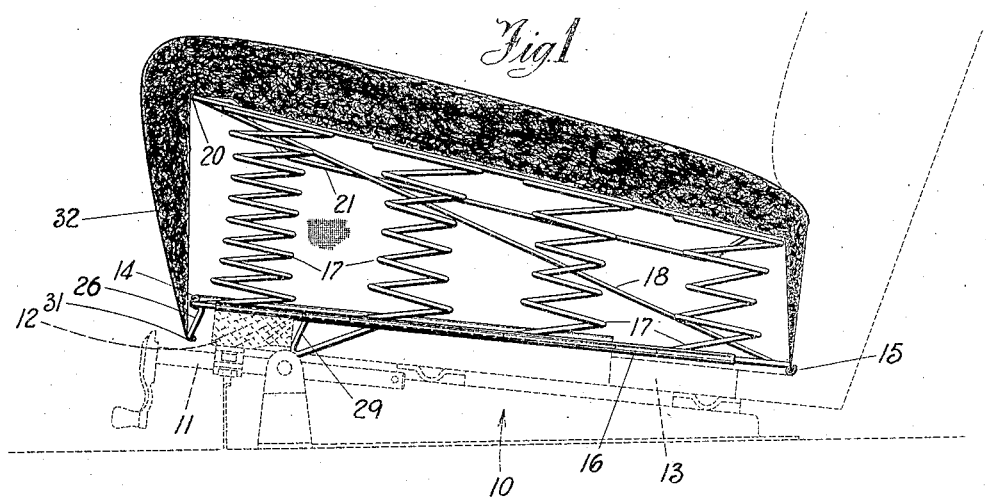
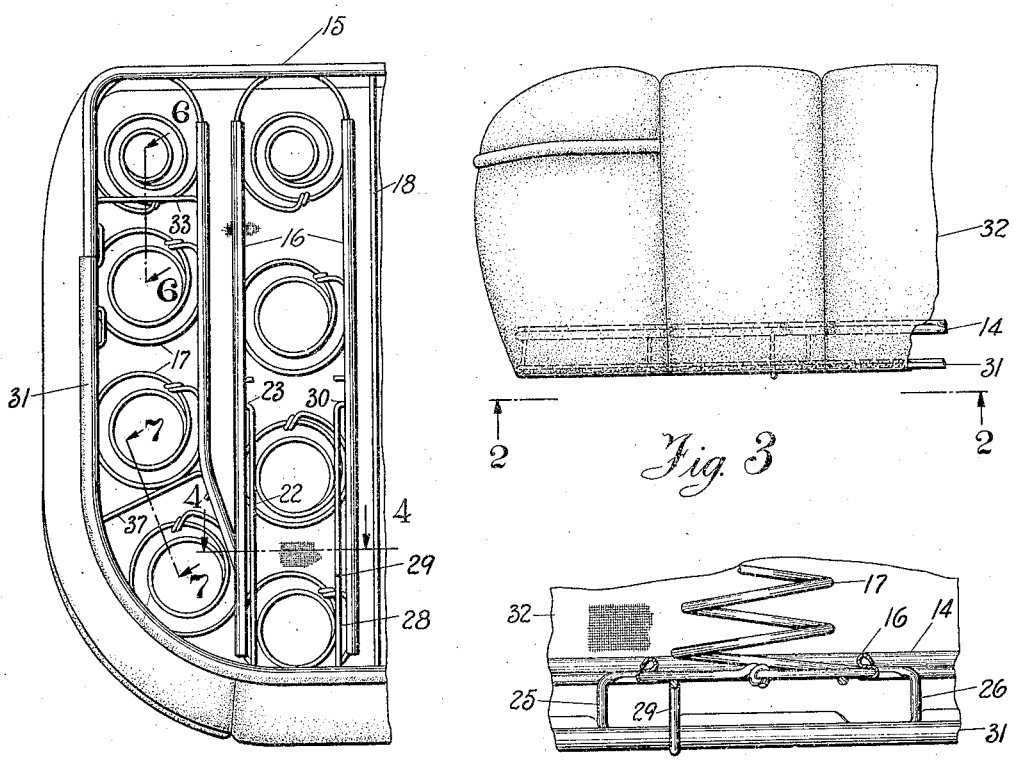

March 7, 1933.  A. H. ACKERMAN  1,899,927
VEHICLE SEAT
Filed March 28, 1930   2 Sheets-Sheet 2
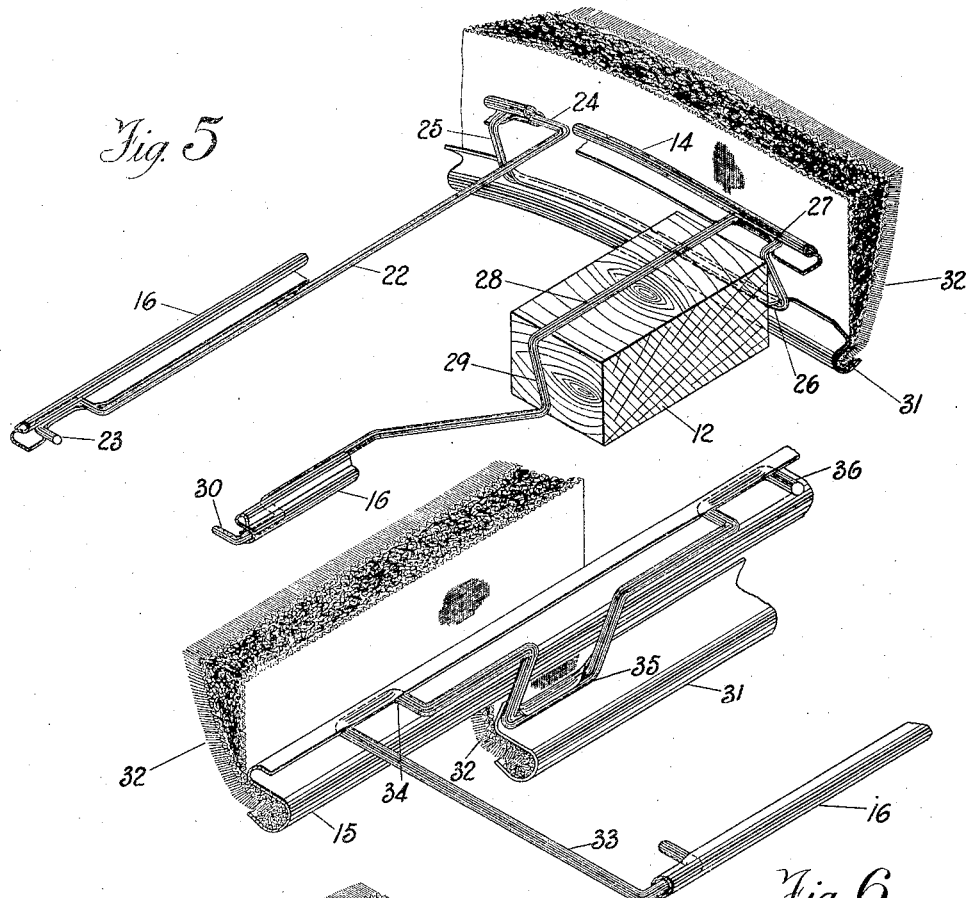
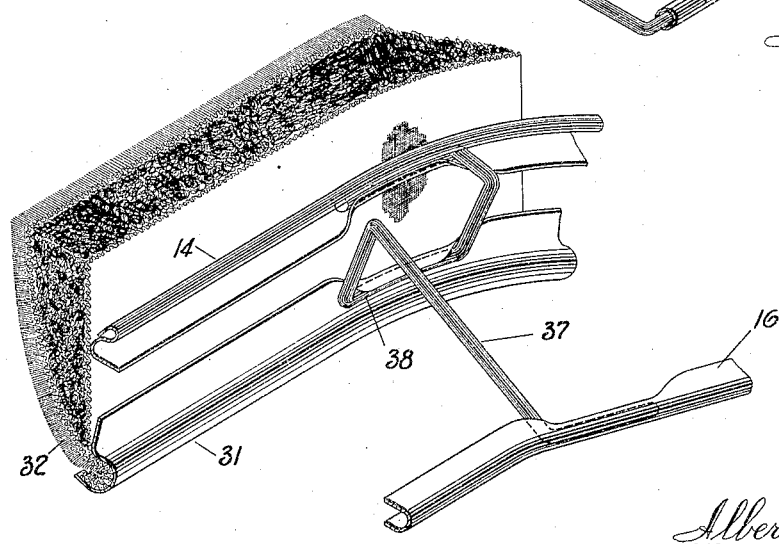
INVENTOR.
Albert H. Ackerman
BY P. W. Pomeroy
ATTORNEY Patented Mar. 7, 1933

1,899,927

UNITED STATES PATENT OFFICE

ALBERT H. ACKERMAN, OF SOUTH BEND, INDIANA, ASSIGNOR TO THE STUDEBAKER CORPORATION, OF SOUTH BEND, INDIANA, A CORPORATION OF NEW JERSEY

VEHICLE SEAT

Application filed March 28, 1930. Serial No. 439,744.

This invention relates to seat springs such as are used in motor vehicles and particularly to the provision of a simple construction made up of wire and sheet metal in a manner which gives a maximum strength and which permits of the attachment of the upholstery thereto in a new and novel manner.

An object of the invention is to provide a seat construction which will reduce the cost of the complete body assembly of which the seat forms a part and also adds to the beauty thereof.

A further object is to provide a seat frame formed to include means thereon which will prevent the seat from shifting relative to its support.

A further object is to provide a seat frame with a portion extending beneath the spring supporting means at the front and sides of the frame whereby the valance is extended to cover that portion of the vehicle forming the support for the frame.

Further objects of the invention relate to economies of manufacture and details of construction as will hereinafter appear from the detailed description to follow.

The objects of the invention are accomplished in one instance by the device and means described in the following specification but it is evident that the same may be varied without departing from the scope of the invention as pointed out in the appended claims.

A structure constituting one embodiment of the invention is illustrated in the accompanying drawings forming a part therewith, in which, Figure 1 is a longitudinal sectional view of the seat structure, portions of the vehicle body being shown in dotted lines.

Figure 2 is a fragmentary bottom plan view of the seat structure, looking in the direction of the arrows 2—2 of Figure 3.

Figure 3 is a fragmentary front elevational view of the seat assembly.

Figure 4 is an enlarged fragmentary sectional view taken on the line 4—4 of Figure 2 showing details of the seat frame.

Figure 5 is a fragmentary perspective view showing a portion of the seat support and the seat frame structure which prevents shifting of the seat relative to its support.

Figure 6 is a fragmentary perspective view showing that part of the seat frame as indicated by the arrows 6—6 in Figure 2.

Figure 7 is a fragmentary perspective view showing that portion of the seat frame as indicated by the arrows 7—7 in Figure 2.

Referring to the accompanying drawings in which like numerals refer to like parts throughout the several views, I have shown in Figure 1 (in dotted lines) a seat support indicated by the numeral 10 which if desired may include adjusting mechanism 11 to shift the seat longitudinally relative to the body. The seat support includes a cross member 12 positioned at the forward edge of the support 10 and with a cross member 13 positioned adjacent to the rear end of the support 10.

The cushion frame includes a substantially S-shaped member 14 extending around the front and a portion of the sides of the seat structure and an S-shaped frame member 15 extending around the back and a portion of the side of the seat structure. A plurality of longitudinally extending S-shaped supporting bars 16 constitute with the supporting bars 14 and 15, supports for the springs 17. The springs 17 are preferably helical or coiled wires smallest in diameter at their middle portions and thus of double conical form and have their bases secured to the supports as by being clamped thereto as is shown in Figures 2 and 4. Attached to the frame members 15 are braces 18 which extend forwardly and upwardly and are attached at their opposite ends to the upper seat frame member 20. I also provide brace wires 21 which may be attached to the upper frame member 20 in any suitable manner. As the upper frame member 20 of the frame structure forms no part of my invention except in so far as a frame member at the top of the spring structure is desirable as forming a support for the upholstery and attaching means for the upper ends of the spring 17, a further description of the same is thought to be unnecessary.

A brace preferably formed of spring wire having one leg 22 thereof secured at its end 23 in one of the longitudinally extending S-shaped supporting bars 16 is bent and clamped at 24 in the frame supporting bar 14 as is clearly shown in Figure 5. The brace is bent to provide a downwardly extending segment 25 and has another bend therein to form a portion 26 extending beneath and substantially parallel with the frame member 14 as shown in Figure 5. This brace has a second portion 27 adapted to be clamped in the S-shaped supporting member 14 in spaced relationship to the portion 24 and is then extended rearwardly to provide the brace member 28 having an offset portion 29 therein and having its end 30 secured in one of the S-shaped supporting bars 16 in spaced relationship to the end 23 of the leg 22. The offset portion 29 in the brace 28 is adapted to seat against the rear face of the cross member 12 to thus prevent the seat structure from moving forwardly on its support. When the seat structure is moved into operative position, the rear end thereof will rest on the cross member 13 and will engage with the seat back so that the seat structure is thereby prevented from shifting rearwardly relative to its support so that it is only necessary to provide means for preventing the seat structure from moving forwardly relative to its support which is accomplished in the present instance by means of the offsets 29 in the braces 28.

The portion 26 of the brace which is spaced from and extends parallel with the frame portion 14 in addition to forming a part of the bracing means for the frame has the further advantage of forming the support for an upholstery receiving channel 31 extending around the front and a portion of the sides of the seat, as is clearly shown in Figure 2. The member 31 has an outwardly facing recess therein adapted to receive the upholstery 32 as is shown in Figures 5, 6 and 7. The upholstery channel 31 extends beneath and is positioned in substantially parallel relationship with the frame member 14 so that the cushion valance at the front and along the sides of the seat extends beyond the spring supporting frame to conceal the frame supporting member 12 or other support which may be utilized for carrying the spring structure whereby the seat assembly conceals from view the supporting means therefor.

Heretofore it has been the practice to attach the upholstery to the spring supporting member and provide a finishing strip on the frame support, thus making it necessary to force the seat back of this finishing strip which is unsightly and which is likely to cause wear and damage to the seat valance.

In some seat structures, it is unnecessary to extend the valance beneath the spring supporting frame around the back of the seat cushion and around the portion of the sides thereof. I have therefore shown in Figure 6, the upholstery 32 as being secured to the frame supporting member 15 at the rear side of the cushion and as being extended to be supported in the member 31 at the sides of the seat.

In addition to the braces heretofore described, I preferably provide cross braces 33 adjacent to the rear of the seat, one end of the brace 33 being clamped in the member 16 and having its bent portion 34 clamped in the S-shaped member 15. Each brace 33 preferably has a depending portion 35 attached to the member 31 to provide a support and spacing means for the latter, the brace 33 being attached at its extreme end 36 in the spring supporting member 15 so that there is a double support at 34 and 36 for the brace 33 intermediate which the upholstery supporting member 31 is attached in spaced relation thereto.

Also to provide a more rigid structure, I also preferably provide cross braces 37 as shown in Figure 7, one end of which is attached to one of each of the S-shaped members 16, and the opposite end being secured in the spring supporting member 14. The brace 37 also has a depending portion 38 secured to the upholstery attaching member 31 to provide a support therefor at the corner of the cushion.

While I have shown and described in considerable detail a specific embodiment of my invention, it is to be understood that the drawings and description are illustrative only and for the purpose of rendering my invention more clear and that I do not regard the invention as limited to the details of construction illustrated or described except in so far as I have included such limitations within the terms of the following claims in which it is my intention to claim all the novelty in my invention broadly as well as specifically.

What I claim is:

1. In a spring seat structure, a lower border frame, spring supporting bars extending substantially perpendicular to a portion thereof, an upholstery receiving member extending below and parallel to a portion of said border frame, a bent wire brace member secured at its ends to said spring supporting bars and intermediate its length to said border frame and said upholstery receiving member, and an offset in said brace adapted to bear against a seat supporting member to retain said seat in place.

2. In a spring seat structure, a border frame member spring supporting bars extending substantially perpendicular to a portion thereof, brace members attached to said bars and to said frame member having depending portions extending below said frame member, an upholstery receiving member supported solely by said depending portions of said brace members, and upholstery secured to said receiving member extending upwardly to provide a cover for said seat structure.

3. In a spring seat structure, a border frame member spring supporting bars extending substantially perpendicular to a portion thereof, brace members attached to said bars and to said frame member having depending portions extending therebeneath, an upholstery receiving member beneath and substantially parallel with said frame member supported by the depending portions of said brace members, and upholstery secured to said receiving member extending upwardly to provide a cover for said seat structure.

4. In a spring seat structure, a lower border frame member, an upholstery attaching member substantially parallel with and immediately below said border frame member in spaced relation thereto, bent wire brace members securing said upholstery attaching member to said border frame member, and means attached to said upholstery attaching member extending upwardly to provide a cover for said border frame member.

5. In a spring seat structure, a frame member extending along the front of said structure supporting seat springs, means secured to said member having a depending portion to prevent movement of said seat structure in one direction on its support, a second frame member supported by said means beneath said first frame member in spaced relation thereto, and upholstery attached to said second frame member extending upwardly to conceal said first frame member and said depending portion of said means.

6. In a spring seat structure, a border frame, spring supporting bars extending substantially perpendicularly to said border frame, an upholstery attaching frame below said border frame, bent wire brace members connecting said spring supporting bars to said border frame having depending portions connecting said upholstery attaching frame to said border frame.

7. In a spring seat structure, a border frame, spring supporting bars extending substantially perpendicularly to said border frame, an upholstery attaching frame below said border frame, U-shaped bent wire brace members connecting said spring supporting bars to said border frame having depending portions connecting said upholstery attaching frame to said border frame.

8. In a spring seat structure, a border frame, spring supporting bars extending substantially perpendicularly to said border frame, an upholstery attaching frame below said border frame, U-shaped bent wire braces having legs attached to said spring supporting bars connected to said border frame and having depending intermediate portions connecting said upholstery attaching frame to said border frame.

9. In a spring seat construction, a border frame, spring supporting bars extending substantially perpendicularly to said border frame, an upholstery attaching frame below said border frame, U-shaped bent wire braces having legs attached to spring supporting bars connected to said border frame and having depending intermediate portions connecting said upholstery attaching frame to said border frame, at least one leg of said U-shaped braces being provided with an offset portion for engaging a seat supporting member.

10. In a spring seat construction, a border frame, spring supporting bars extending substantially perpendicularly to said border frame, an upholstery attaching frame below said border frame, brace members connecting said spring supporting bars to said border frame having downwardly bent portions for connecting said upholstery attaching frame to said border frame, said downwardly bent portions being adapted to overlie the seat support to conceal the same and said border frame.

11. In a spring seat construction, a border frame, spring supporting bars extending substantially perpendicularly to said border frame, an upholstery attaching frame spaced downwardly from said border frame at front of seat to form a valance to conceal said border frame and seat support, said upholstery attaching frame being supported by a downwardly bent portion of a brace member connecting said border frame and said frame supporting bars.

12. In combination with a spring seat structure comprising, a border frame, spring supporting bars extending substantially perpendicularly to said border frame, an upholstery attaching frame below said border frame, and a seat supporting member having a horizontal and a vertical face, bent wire brace members connecting said spring supporting bars, said border frame and said upholstery attaching frame, each of said brace members being provided with a downwardly extending projection having a substantially vertical front side and a sloped rear side, whereby said seat structure may be forced backwardly and retained in place by the engagement of the vertical front side of said projection with the vertical side of said seat supporting member.

13. In combination with a seat support, a spring seat structure comprising, a border frame spring supporting bars extending substantially perpendicularly thereto, an upholstery attaching frame arranged below said border frame at front and sides, sloping upwardly on the sides from the front to the back and an upholstery member attached at its lower edge to said upholstery attaching frame and extending over said border frame to provide a downwardly extending valance at the front and the front of the sides of said seat to conceal said border frame and seat support.

Signed by me at South Bend, Indiana, this 26 day of March 1930.

ALBERT H. ACKERMAN.